United States Patent [19]
Georget

[11] Patent Number: 4,944,717
[45] Date of Patent: Jul. 31, 1990

[54] RIBBED BELT FOR POWER TRANSMISSION

[75] Inventor: Pierre Georget, Chambray les Tours, France

[73] Assignee: Hutchinson, Paris, France

[21] Appl. No.: 373,140

[22] Filed: Jun. 29, 1989

[30] Foreign Application Priority Data

Jun. 30, 1988 [FR] France .................. 88 08807

[51] Int. Cl.$^5$ .............................................. F16G 5/06
[52] U.S. Cl. .................................................. 474/238
[58] Field of Search ............... 474/204, 205, 237, 238, 474/265, 268

[56] References Cited

U.S. PATENT DOCUMENTS

| | | | |
|---|---|---|---|
| 2,274,515 | 2/1942 | Yelm | 474/237 X |
| 4,332,576 | 6/1982 | Stecklein et al. | 474/238 X |
| 4,498,891 | 2/1985 | Mashimo et al. | 474/205 |
| 4,579,548 | 4/1986 | Howerton | 474/238 |
| 4,647,278 | 4/1987 | Hull | 474/205 |
| 4,773,895 | 9/1988 | Takami et al. | 474/238 |

FOREIGN PATENT DOCUMENTS

| | | |
|---|---|---|
| 0034225 | 8/1981 | European Pat. Off. . |
| 0122869 | 10/1984 | European Pat. Off. . |
| 0249404 | 1/1988 | European Pat. Off. . |
| 839801 | 6/1960 | United Kingdom . |

*Primary Examiner*—Thuy M. Bui
*Attorney, Agent, or Firm*—Browdy and Neimark

[57] ABSTRACT

The invention relates to a power transmission belt having a circumferentially ribbed inner surface. According to the invention, the sides (42) of each rib (38) join a small base (40) of the rib via respective convex curved surfaces (44), and the small base (40) of each rib is itself constituted by a concave curved surface. The invention is particularly applicable to transmission belts used in the automobile industry and in household electrical appliances.

6 Claims, 1 Drawing Sheet

RIBBED BELT FOR POWER TRANSMISSION

The invention relates to power transmission belts of the type having a "ribbed" inside surface, i.e. having circumferentially-extending ribs.

BACKGROUND OF THE INVENTION

Such belts have accurate geometrical shapes which satisfy standards, e.g. German standard DIN 7867 or draft international standard ISO R 15-506. They are used in particular in the automobile and household appliance industries (e.g. for driving a drum in a washing machine or a tumble drier) and they may include ribs having truncated tops, i.e. which are trapeziumshaped in cross-section.

After a certain amount of service, it is observed that belts of this type often suffer from cracking along the edges between the small bases and the sides of trapezium-section ribs. The cracking is due to stress concentrations on the edges by virtue of contact between the sides and the edges of the ribs against the corresponding surfaces of the pulleys over which the belt passes, and it gives rise to rapid destruction of or damage to the belt.

The object of the present invention is to avoid this drawback of prior art belts, and consequently to increase belt lifetime.

SUMMARY OF THE INVENTION

To this end, the present invention provides a ribbed belt for transmitting power, the belt having an inner surface comprising circumferential ribs with truncated apexes and cross-sections which are substantially trapezium-shaped, wherein the small base of each rib comprises a concave curved surface and joins the sides of the rib via convex curved surfaces.

The effect of replacing the edges between pairs of plane surfaces on the ribs of prior art belts by convex curved surfaces is to reduce stress concentrations in such zones to a very large extent. As a result, belt lifetime is correspondingly increased, sometimes by as much as 50%.

In addition, the concave shape of the small bases of the ribs has the effect of altering the distribution of pressure on the sides of the ribs when they are in contact with the pulleys in a manner which is favorable to reducing stresses on said sides.

The radius of curvature R1 in cross-section of each convex curved surfaces may lie in the range 0.2 mm to 2 mm, as a function of rib size, and said surfaces are preferably constituted by portions of circular-section toruses.

The radius of curvature in cross-section of the concave surface may lie in the range 0.5 mm to 100 mm, depending on belt size.

Preferably, this concave surface directly joins the convex surfaces leading to the sides of the ribs.

BRIEF DESCRIPTION OF THE DRAWING

An embodiment of the invention is described by way of reference to the accompanying drawing, in which.

DETAILED DESCRIPTION

Figure 1:
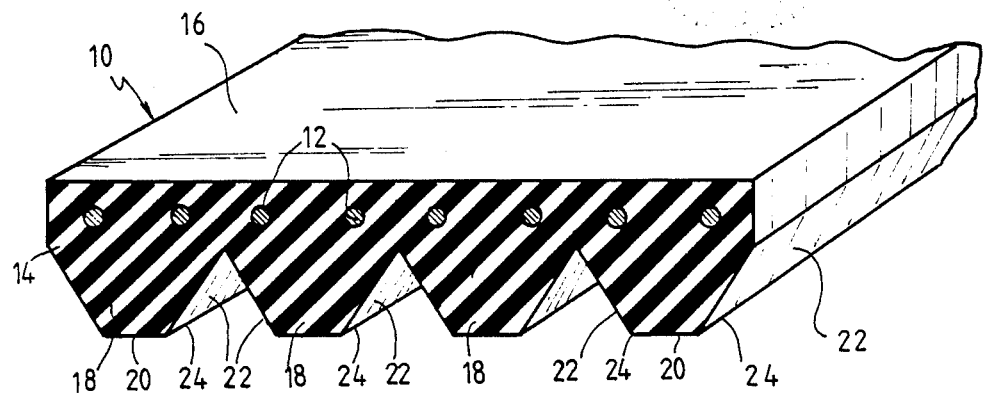
FIG. 1 is a view in section and in perspective of a prior art ribbed belt.

By way of the example, FIG. 1 shows a ribbed belt of the prior art, given an overall reference 10 and comprising internal longitudinal reinforcement in the form of cables 12 embedded in an elastomer material 14 such as a rubber or a mixture of rubbers of the type conventionally used for making power transmission belts.

The outer face 16 of the belt 10 is substantially flat or smooth, whereas its inner face is shaped with circumferential ribs 18 having truncated apexes, thus giving them generally trapezium-shaped cross-sections including respective small bases 20 meeting pairs of sloping sides 22 via edges 24.

When the belt 10 is in operation and passing over a pulley, the sides 22 of the ribs 20 are pressed against corresponding surfaces of parallel grooves in the pulley and stresses are concentrated at the edges 24, thereby causing cracking and crazing to take place, leading to destruction of the belt.

Figure 2:
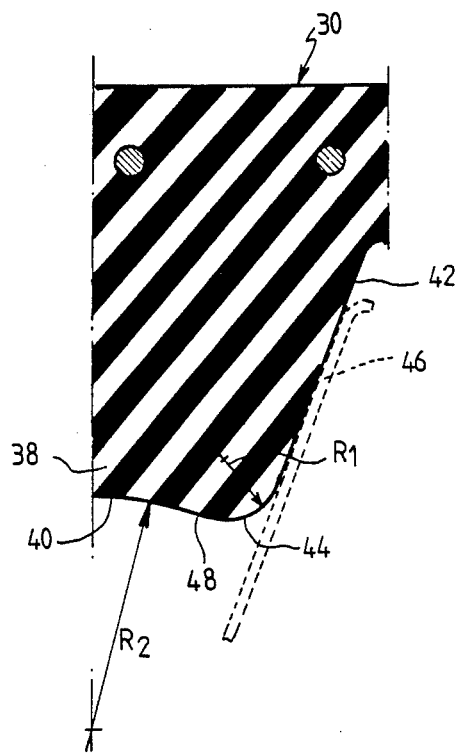
FIG. 2 is a half section through one rib of a belt in accordance with the invention.

The invention serves to avoid these drawbacks by giving each rib a special shape which is shown on a larger scale in FIG. 2.

FIG. 2 is a half section through one rib of a belt 30 in accordance with the invention, which belt is of the same type as the belt 10 as shown in FIG. 1. The small base 40 of each rib 38 joins each side 42 of the rib via a convex curved surface 44 constituted, for example, by a portion of a torus of circular section, such that said surface 44 is represented in the half section of FIG. 2 by an arc of a circle.

Depending on the dimensions of the belt 30 and of the ribs 38, the radius of curvature R1 of this convex surface 44 may lie in the range 0.2 mm to 2 mm, being 0.4 mm, for example, when the rib is about 2 mm high.

These convex curved surfaces 44 which replace the sharp edges 24 of prior art belts 10 have the effects of spreading the stresses due to contact with a groove 46 of a pulley (shown diagrammatically in FIG. 2) over the side 42 and of reducing stress concentration on the surface 44. This serves to avoid crazing or cracking appearing at the edges 24 as happens in the prior art after the belt has been in use for a certain length of time.

By way of example, it may be mentioned that the stresses in the convex curved zone 44 are divided by a factor of about 2, other things being equal.

In order to further reduce the stress concentrations in this zone, the small base of each rib 38 is constituted by a concave curved surface 40 whose radius of curvature R2 in cross-section may lie in the range 0.5 mm to 100 mm depending on the dimensions of the belt and of the ribs 38. This radius of curvature R2 may be 2 mm, for example, when the ribs 38 are about 2 mm high.

The curved surface 40 forming the small base of each rib directly joins the curved surfaces 44 leading to the sides 42, such that the profile of each rib 38 is curved in continuous manner having a point of inflection 48 between each of the convex surfaces 44 and the concave surface 40.

Like the convex surfaces 44, the concave surface 40 may be constituted by a portion of a circular section torus and may therefore be represented, as in FIG. 2, by an arc of a circle.

The presence of such a concave curved surface 40 at the base of each rib 38 has the effect of changing the way pressure is distributed over the sides 42 of the ribs on passing through the pulleys, and in such a manner as to tend to reduce stresses in the convex curved zones 44.

In general, the invention makes it possible to increase the service life of transmission belts of this type by an amount which may be as much as 50%, and this is achieved merely by means of a simple change to the shape of a portion of the ribs. In addition, this shape of the invention helps reduce the noise that occurs when the belt passes over pulleys since lateral air-evacuating channels are formed at the bases of the ribs by the above-specified curved surfaces.

I claim:

1. A ribbed belt for transmitting power, the belt having an inner surface comprising circumferential ribs with truncated apexes each having a small base and cross-sections which are substantially trapeziumshaped, wherein the small base of each rib comprises a concave curved surface and joins the sides of the rib via convex curved surfaces.

2. A belt according to claim 1, wherein the cross-sections of the convex surfaces are circular arcs.

3. A belt according to claim 1, wherein the convex curved surfaces each have a radius of curvature R1 in cross-section in the range 0.2 mm to 2 mm.

4. A belt according to claim 1, wherein the cross-section of said concave surface is constituted by a circular arc.

5. A belt according to claim 4, wherein the circular arc has a radius of curvature R2 in cross-section in the range 0.5 mm to 100 mm.

6. A belt according to claim 1, wherein the concave curved surface of the small base directly joins the convex curved surface connecting it to the sides of the rib.

* * * * *